United States Patent [19]

Okumoto et al.

[11] Patent Number: 5,007,643
[45] Date of Patent: Apr. 16, 1991

[54] GOLF CLUB HEAD

[75] Inventors: Takaharu Okumoto, Chigasaki; Tatsuo Nishimoto; Hideaki Wakaki, both of Hiratsuka, all of Japan

[73] Assignee: The Yokohama Rubber Co., Ltd., Tokyo, Japan

[21] Appl. No.: 431,120

[22] Filed: Nov. 3, 1989

[30] Foreign Application Priority Data

Nov. 4, 1988 [JP] Japan .................... 63-277429

[51] Int. Cl.⁵ .............................. A63B 53/04
[52] U.S. Cl. .................. 273/167 R; 273/DIG. 23; 273/DIG. 7; 273/167 H; 264/45.3; 264/DIG. 6
[58] Field of Search .......... 273/DIG. 7, DIG. 23, 273/167 H, 169, 167 J, 167 R, 170–175; 264/DIG. 6, DIG. 83, 45.3, 328.18, 328.2, 297.2; 428/308.4, 318.4; 425/817 R

[56] References Cited

U.S. PATENT DOCUMENTS 4,650,626 3/1987 Kurokawa ............... 273/167 R X

FOREIGN PATENT DOCUMENTS 60-122580 7/1985 Japan ........................ 273/169

Primary Examiner—Edward M. Coven
Assistant Examiner—Sebastiano Passaniti
Attorney, Agent, or Firm—Finnegan, Henderson, Farabow, Garrett & Dunner

[57] ABSTRACT

A golf club head composed of an outer shell made of a fiber-reinforced resin and a core made of a syntactic foam and formed in the outer shell, wherein the syntactic foam comprises a matrix resin with glass microballoons as a main component and whiskers mixed therein.

5 Claims, 1 Drawing Sheet

GOLF CLUB HEAD

BACKGROUND OF THE INVENTION

The present invention relates to a golf club head made of a fiber-reinforced resin, and more particularly, to a golf club head having the durability of its club head body improved by increasing the impact fracture strength of its core.

Most wooden golf club heads made of a fiber-reinforced resin are composed of an outer shell made of a fiber-reinforced resin and a core made of a rigid polyurethane foam formed in the outer shell which are unitarily bonded by molding. However, the rigid polyurethane foam has a defect since it has a low compression strength. When it is compression-molded together with the outer shell in a molding die under a high pressure, it is crushed to form voids on the surface of the outer shell. A method of overcoming this defect was proposed in which the rigid polyurethane foam is replaced with a syntactic foam composed of a mixture of a matrix resin with glass microballoons. To relieve the psychological uneasiness of the golfer when he hits a ball, it is desirable to design a golf club head to have a largish size. In such a largish golf club head, the specific gravity of the core must be reduced. However, when the amount of the glass microballoons in the matrix resin is increased in order to reduce the specific gravity of the core made of the syntactic foam, the impact fracture strength of the core is reduced and the golf club head is apt to be cracked disadvantageously.

SUMMARY OF THE INVENTION

An object of the present invention is to provide a golf club head having the durability of its club head body improved by increasing the impact fracture strength of the core made of a syntactic foam.

Another object of the present invention is to provide a golf club head capable of being designed to have a largish size by reducing the specific gravity of the syntactic foam by increasing the impact fracture strength of the core made of the syntactic foam.

These objects of the present invention can be attained by a golf club head composed of an outer shell made of a fiber-reinforced resin and a core made of a syntactic foam buried in the outer shell, characterized in that the syntactic foam comprises a matrix resin with glass microballoons as the major component and whiskers mixed therein.

By mixing whiskers in the syntactic foam, the impact fracture strength of the core is increased and the durability of the golf club head is improved. Another advantage is that since the specific gravity of the syntactic foam can be reduced by increasing the impact fracture strength thereof, the golf club head can be designed to have a largish size. By making the golf club head larger, the psychological uneasiness of the golfer can be relieved.

DETAILED DESCRIPTION OF THE INVENTION

Figure 1:
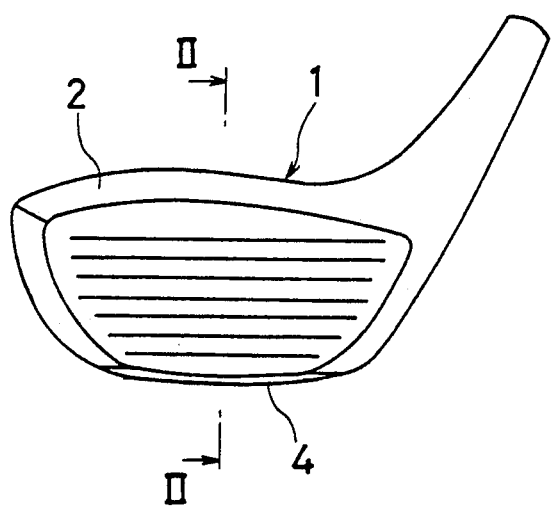
FIG. 1 is a front view of a wooden golf club head according to an embodiment of the present invention.
Figure 2:
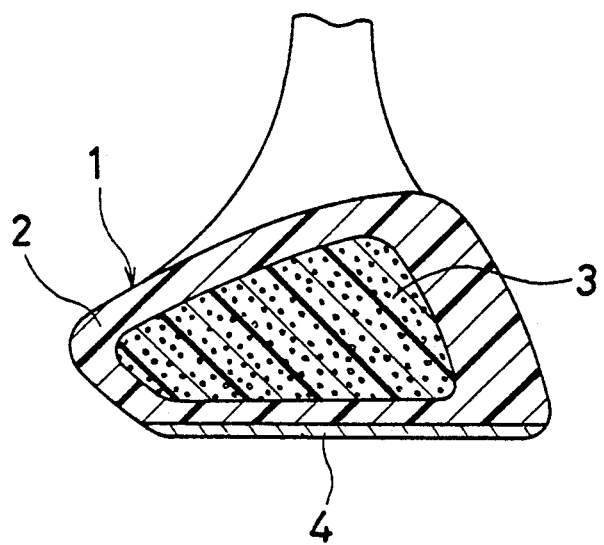
FIG. 2 is a cross-section taken along a line II—II as indicated by arrows in FIG. 1.

In FIGS. 1 and 2, 1 indicates a wooden type golf club head according to an embodiment of the present invention. The wooden type golf club head 1 is composed of an outer shell made of a fiber-reinforced resin, a core 3 made of a syntactic foam which is buried therein and a metallic sole plate 4 formed on the underside thereof which are unitarily combined. The syntactic foam constituting the core 3 comprises a matrix resin containing glass microballoons mixed therein and a small amount of whiskers mixed therein.

The fiber-reinforced resin for forming the outer shell of the golf club head of the present invention may be any of those usually used for fiber-reinforced resin golf club heads. In particular, the resins for the outer shell include thermosetting resins such as vinyl ester resins, epoxy resins and unsaturated polyester resins. The reinforcing fibers to be mixed in the resin include, for example, carbon fibers, glass fibers and aromatic polyamide fibers.

The syntactic foam constituting the core comprises a matrix resin and glass microballoons as the main component in which whiskers are mixed. If necessary, a hardener for the matrix resin, etc. may be added thereto. As the matrix resin of the syntactic foam, a thermosetting resin such as a vinyl ester resin, epoxy resin or unsaturated polyester resin is usable. Among them, the vinyl ester resin is the most suitable. As the whiskers, for example silicon carbide whiskers or potassium titanate whiskers are preferably used.

The amount of the glass microballoons to be mixed in the syntactic foam constituting the core is in the range of 25 to 45 parts by weight, preferably 32 to 40 parts by weight, for 100 parts by weight of the matrix resin. When the amount of the glass microballoons is less than 25 parts by weight, the specific gravity of the syntactic foam is too high to produce the club head having such a size with which the golfer will have a psychological easiness. On the contarary, when it exceeds 45 parts by weight, the impact fracture strength is reduced. Therefore, when the amount of the glass microballoons is large, the amount of the whiskers to be mixed must be increased to increase the impact fracture strength. However, when the amount of the whiskers mixed is excessive, the moldability is impaired and the production of the intended product on a commercial basis becomes difficult.

The amount of the whiskers in the syntactic foam is preferably in the range of 3 to 8 parts by weight for 100 parts by weight of the matrix resin. When it is less than 3 parts by weight, the intended improvement of the impact fracture strength becomes difficult and when it exceeds 8 parts by weight, the moldability of the syntactic foam is impaired.

When the whiskers are homogeneously dispersed in the matrix resin, the impact fracture strength can be further improved. The pretreatment of the surface of the whiskers with a surfactant is preferred for the homogeneous dispersion of the whiskers. The wettability of the whiskers with the matrix resin is improved by the surface treatment of them and, as a result, the high dispersibility is obtained.

The core of the golf club head of the present invention has an improved impact fracture strength, since the whiskers are mixed in the syntactic foam constituting the core as described above. Accordingly, the durability of the golf club head is improved. Further, since the impact fracture strength of the syntactic foam constituting the core is improved, it can be kept at a necessary level even when the amount of the glass microballoons is increased to reduce the specific gravity. Thus the psychological condition of the golfer can be improved when he hits the ball, since the golf club head can be designed to have a largish size by thus reducing the specific gravity of the core.

The present invention will now be described in greater detail in conjunction with Examples and Comparative

EXAMPLES

Comparative Examples 1 to 3

100 parts by weight of a vinyl ester resin (M 7020, a product of Showa High Polymer Co., Ltd.) was mixed with 32 parts by weight (Comparative Example 1), 37 parts by weight (Comparative Example 2) or 40 parts by weight (Comparative Example 3) of glass microballoons (C15/250, a product of 3M Co.) to prepare three unhardened syntactic foams each in the form of a paste. Each of the three unhardened syntactic foams was placed in a core-molding die and heated at 130° C. in an oven for 30 minutes to harden it. The molding thus obtained was removed from the die and after-cured at 150° C. for 2 hours to form a core.

After surface correction treatments such as removal of fins of the core, it was covered with a sheet molding compound consisting of carbon fibers impregnated with a vinyl ester resin and also with cloth prepreg consisting of carbon fibers impregnated with the vinyl ester resin. A metallic sole plate was placed at the bottom of it. They were placed in a compression molding die for forming a golf club head and hardened by heating under pressure to form an integral wooden golf club head.

Examples 1 to 3 and Comparative Examples 4 and 5:

The syntactic foam containing 32 parts by weight of glass microballoons prepared in Comparative Example 1 was mixed with 3 parts by weight (Example 1), 5 parts by weight (Example 2), 7 parts by weight (Example 3), 10 parts by weight (Comparative Example 4) or 15 parts by weight (Comparative Example 5) of pottassium titanate whiskers (TISMO-D, a product of Otsuka Chemical Co., Ltd.) to prepare five unhardened syntactic foams each in the form of a paste.

Cores were formed from the unhardened syntactic foams in the same manner as in Comparative Examples 1 to 3 and wooden golf club heads were produced by molding from the cores.

Example 4 and Comparative Example 6

The syntactic foam containing 37 parts by weight of the glass microballoons prepared in Comparative Example 2 was mixed with 7 parts by weight (Example 4) or 10 parts by weight (Comparative Example 6) of potassium titanate whiskers to prepare two unhardened syntactic foams each in the form of a paste.

Cores were formed from the unhardened syntactic foams in the same manner as in Comparative Examples 1 to 3 and wooden golf club heads were produced by molding from the cores.

EXAMPLES 5 and 6

The syntactic foam containing 40 parts by weight of glass microballoons prepared in Comparative Example 3 was mixed with 3 parts by weight (Example 5) or 8 parts by weight (Example 6) of potassium titanate whiskers to prepare unhardened syntactic foams each in the form of a paste.

Cores were formed from the unhardened syntactic foams in the same manner as in Comparative Examples 1 to 3 and wooden golf club heads were produced by modling from the cores.

The moldability and compression strength of the cores prepared in Examples 1 to 6 and Comparative Examples 1 to 6, and the impact fracture strength of the wooden golf club heads were examined to obtain the results shown in the below given Table 1.

It is apparent from the results obtained in Comparative Examples 1 to 3 shown in the Table 1 that as the amount of the glass microballoons to be mixed with the syntactic foam is increased to reduce the specific gravity, the compression strength was reduced and, therefore, the impact fracture strength was reduced.

It is also apparent from the results obtained in Examples 1 to 6 and Comparative Examples 4 to 6 that excellent compression strength and impact fracture strength as well as an excellent moldability in forming the core are obtained when the amount of the whiskers to be mixed with the syntactic foam is 3 to 8 parts by weight for 100 parts by weight of the matrix resin.

Further, in the below Table 1, the compression strength indicates a strength (kg/cm$^2$) at which a columnar test piece having a diameter of 40 mm and a height of 80 mm is fractured when a compression load is applied thereto. The compression strength is shown in terms of an index, taking the strength in Comparative Example 3 as 100.

Also, the impact fracture strength was determined by observing the deformation of the core caused when the golf club head was produced by compression molding in the die and deformation thereof caused after a ball hitting test during which a molded golf club head was used. The results are shown on the basis of the following criteria:
X:poor
O:good
◎:very good Further, the moldability is shown in terms of the workability observed when the foam was molded into the core with the die. The results are shown on the basis of the following criteria:
X:poor
Δ:fair
O:good
◎:very good

TABLE 1

| | Core | | | | | | Club Head Impact Fracture Strength |
|---|---|---|---|---|---|---|---|
| | Composition (parts by weight) | | | Properties | | | |
| | Matrix | Microballoon | Whisker | Specific Gravity | Compression Strength* | Moldability | |
| Comp. Ex. 1 | 100 | 32 | 0 | 0.41 | 110 | O | O |
| Comp. Ex. 2 | 100 | 37 | 0 | 0.39 | 104 | O | Δ |

TABLE 1-continued

| | Core | | | | | | Club Head Impact |
|---|---|---|---|---|---|---|---|
| | Composition (parts by weight) | | | Properties | | | |
| | Matrix | Micro-balloon | Whisker | Specific Gravity | Compression Strength* | Moldability | Fracture Strength |
| Comp. Ex. 3 | 100 | 40 | 0 | 0.38 | 100 | ○ | X |
| Example 1 | 100 | 32 | 3 | 0.43 | 128 | ○ | ◉ |
| Example 2 | 100 | 32 | 5 | 0.43 | 140 | ○ | ◉ |
| Example 3 | 100 | 32 | 7 | 0.44 | 145 | ○ | ◉ |
| Comp. Ex. 4 | 100 | 32 | 10 | 0.45 | 142 | △ | ◉ |
| Comp. Ex. 5 | 100 | 32 | 15 | 0.48 | 98 | X | X |
| Example 4 | 100 | 37 | 7 | 0.42 | 133 | ◉ | ○ |
| Comp. Ex. 6 | 100 | 37 | 10 | 0.43 | 123 | ◉ | X |
| Example 5 | 100 | 40 | 3 | 0.39 | 118 | ○ | ○ |
| Example 6 | 100 | 40 | 8 | 0.40 | 119 | ○ | ○ |

*Index

What is claimed is:

1. A golf club head comprising an outer shell made from a fiber-reinforced resin and an inner core made of a syntactic foam formed in the outer shell, said syntactic foam comprising a matrix resin containing glass microballoons ranging from 25 to 45 parts by weight per 100 parts by weight of the matrix resin and whiskers ranging from 3 to 8 parts by weight per 100 parts by weight of the matrix resin mixed therein.

2. The golf club head of claim 1, wherein the matrix resin is a thermosetting resin selected from the group consisting of vinyl ester resins, epoxy resins and unsaturated polyester resins.

3. The golf club head of claim 1, wherein the whiskers are selected from the group consisting of silicon carbide whiskers and potassium titanate whiskers.

4. The golf club head of claim 1, wherein the reinforcing fibers of the fiber-reinforced resin are selected from the group consisting of carbon fibers, glass fibers and aromatic polyamide fibers.

5. The golf club head of claim 1, which has the shape of a wooden golf club head.

* * * * *